(12) United States Patent
Jacobs et al.

(10) Patent No.: US 6,396,725 B1
(45) Date of Patent: May 28, 2002

(54) SYSTEM AND METHOD FOR IMPROVING CONTROL LOOP RESPONSE OF A POWER SUPPLY

(76) Inventors: Mark E. Jacobs, 7615 Applecross La., Dallas, TX (US) 75248; Allen F. Rozman, 2901 Wyndham La., Richardson, TX (US) 75082

( * ) Notice: Subject to any disclaimer, the term of this patent is extended or adjusted under 35 U.S.C. 154(b) by 0 days.

(21) Appl. No.: 09/638,183

(22) Filed: Jul. 31, 2000

(51) Int. Cl.[7] ............................................. H02M 7/537
(52) U.S. Cl. ...................................................... 363/131
(58) Field of Search ................................ 363/20, 21.01, 363/21.04, 21.12, 95, 97, 131; 323/265, 266, 282

(56) References Cited

U.S. PATENT DOCUMENTS

| | | | |
|---|---|---|---|
| 4,899,271 A | 2/1990 | Seiersen | 363/126 |
| 5,274,543 A | 12/1993 | Loftus, Jr. | 363/127 |
| 5,291,382 A | 3/1994 | Cohen | 363/16 |
| 5,303,138 A | 4/1994 | Rozman | 363/89 |
| 5,347,442 A * | 9/1994 | Hemmi et al. | 363/41 |
| 5,434,768 A | 7/1995 | Jitaru et al. | 363/21 |
| 5,528,482 A | 6/1996 | Rozman | 363/21 |
| 5,541,828 A | 7/1996 | Rozman | 363/21 |
| 5,590,032 A | 12/1996 | Bowman et al. | 363/15 |
| 5,625,541 A | 4/1997 | Rozman | 363/21 |
| 5,742,491 A | 4/1998 | Bowman et al. | 363/21 |
| 5,861,734 A * | 1/1999 | Fasullo et al. | 323/222 |
| 5,867,379 A * | 2/1999 | Maksimovic et al. | 363/89 |
| 5,870,299 A | 2/1999 | Rozman | 363/127 |
| 5,920,475 A | 7/1999 | Boylan et al. | 363/127 |
| 5,940,287 A | 8/1999 | Brkovic | 363/127 |
| 5,956,245 A | 9/1999 | Rozman | 363/89 |
| 6,002,597 A | 12/1999 | Rozman | 363/21 |
| RE36,571 E | 2/2000 | Rozman | 363/21 |
| 6,011,703 A | 2/2000 | Boylan et al. | 363/21 |
| 6,069,807 A * | 5/2000 | Boylan et al. | 363/97 |

OTHER PUBLICATIONS

"Digital Control for Switching Converters" by T. W. Martin & S. S. Ang: Proceedings of the IEEE International Symposium on Industrial Electronics 1995; pp. 480–484.

"High–Efficiency Multiple–Output DC–DC Conversion for Low–Voltage Systems" by Abram P. Dancy, Rajeevan Amirtharajah, and Anantha P. Chandrakasan; Jun. 2000 IEEE; pp. 252–263.

U.S. Patent Application Ser. No. 09/072,370 entitled "Self–Synchronized Drive Circuit for a Synchronous Rectifier in a Clamped–Mode Power Converter" by Bowman, et al; filed on May 4, 1998.

U.S. Patent Application Ser. No. 09/176,690 entitled "Drive Compensation Circuit for Synchronous Rectifier and Method of Operating the Same" by Jacobs, et al.; filed on Oct. 21, 1998.

U.S. Patent Application Ser. No. 09/518,527 entitled "Method and Apparatus for Dynamically Altering Operation of a Converter Device to Improve Conversion Efficiency" by Jacobs; filed on Mar. 4, 2000.

* cited by examiner

Primary Examiner—Matthew Nguyen

(57) ABSTRACT

A system and method for improving response of a control loop of a power supply. The power supply is configured to drive a load having at least one characteristic associated therewith. In one embodiment, the system includes: (1) a sensing circuit, associated with the power supply, configured to sense the characteristic; and (2) a compensation circuit, coupled to the sensing circuit, configured to adaptively adjust the control loop based on the characteristic to improve the response.

30 Claims, 2 Drawing Sheets

SYSTEM AND METHOD FOR IMPROVING CONTROL LOOP RESPONSE OF A POWER SUPPLY

CROSS-REFERENCE TO RELATED APPLICATIONS AND PATENTS

This application is related to the following U.S. patents and applications:

| Reference No. | Title | Inventor(s) | Date |
|---|---|---|---|
| 09/072,370 ('370 application) | Self-synchronized Drive Circuit for a Synchronous Rectifier in a clamped-mode Power Converter | Bowman, et al. | May 4, 1998 |
| 09/176,690 ('690 application) | Drive Compensation Circuit for Synchronous Rectifier and Method of operating the Same | Jacobs, et al. | Oct. 21, 1998 |
| 09/518,527 ('527 application) | Method and Apparatus for Dynamically Altering Operation of a Converter Device to Improve Conversion Efficiency | Jacobs | March 4, 2000 |
| 4,899,271 ('271 patent) | Power Supply Circuit | Seiersen | Feb. 6, 1990 |
| 5,274,543 ('543 patent) | Zero-Voltage Switching Power Converter with Lossless Synchronous Rectifier Gate Drive | Loftus | Dec. 28, 1993 |
| 5,291,382 ('382 patent) | Pulse Width Modulated DC/DC Converter with Reduced Ripple Current Component Stress and Zero Voltage Switching Capability | Cohen | March 1, 1994 |
| 5,303,138 ('138 patent) | Low Loss Synchronous Rectifier for Application to Clamped-Mode Power Converters | Rozman | April 12, 1994 |
| 5,434,768 ('768 patent) | Fixed Frequency Converter Switching at Zero Voltage | Jitaru, et al. | July 18, 1995 |
| 5,528,482 ('482 patent) | Low Loss Synchronous Rectifier for Application to Clamped-Mode Power Converters | Rozman | June 18, 1996 |
| 5,541,828 ('828 patent) | Multiple Output Converter with Continuous Power Transfer to an Output and with Multiple Output Regulation | Rozman | July 30, 1996 |
| 5,590,032 ('032 patent) | Self-Synchronized Drive Circuit for a Synchronous Rectifier in a Clamped-Mode Power Converter | Bowman, et al. | Dec. 31, 1996 |
| 5,625,541 ('541 patent) | Low Loss Synchronous Rectifier for Application to Clamped-Mode Power Converters | Rozman | April 29, 1997 |
| 5,870,299 ('299 patent) | Method and Apparatus for Damping Ringing in Self-driven Synchronous Rectifiers | Rozman | Feb. 9, 1999 |
| 5,920,475 ('475 patent) | Circuit and Method for Controlling a Synchronous Rectifier Converter | Boylan, et al. | July 6, 1999 |
| 5,940,287 ('287 patent) | Controller for a Synchronous Rectifier and Power Converter Employing the same | Brkovic | Aug. 17, 1999 |
| 5,956,245 ('245 patent) | Circuit and Method for Controlling a Synchronous Rectifier Converter | Rozman | Sept. 21, 1999 |
| 6,002,597 ('597 patent) | Synchronous Rectifier having Dynamically Adjustable Current Rating and Method of Operation Thereof | Rozman | Dec. 14, 1999 |
| 6,011,703 ('703 patent) | Self-synchronized Gate Drive for Power Converter Employing Self driven Synchronous Rectifier and Method of Operation Thereof | Boylan, et al. | Jan. 4, 2000 |
| RE 36,571 ('571 patent) | Low Loss Synchronous Rectifier for Application to Clamped-mode Power Converters | Rozman | Feb. 15, 2000 |

The above-listed applications are commonly assigned with the present invention. The above-listed applications and patents are incorporated herein by reference as if reproduced herein in their entirety.

TECHNICAL FIELD OF THE INVENTION

The present invention is directed, in general, to power supplies and, more specifically, to a system and method for improving control loop response of a power supply.

BACKGROUND OF THE INVENTION

Power supplies are an important and rapidly expanding technology that impacts a broad range of applications including computer systems and telecommunication environments. In many applications requiring a DC output, power supplies employing switched-mode DC-DC converters are frequently employed to advantage. DC-DC converters generally include an inverter, a transformer having a primary winding coupled to the inverter and a rectifier coupled to a secondary winding of the transformer. The inverter generally includes a switching device, such as a field-effect transistor (FET), that converts the DC input voltage to an AC voltage. The transformer then transforms the AC voltage to another value and the rectifier generates the desired DC voltage at the output of the DC-DC converter for application to a load.

Power supplies are often manufactured and sold as standard power modules, where a variety of different customers may purchase the same standard power module and use it in a variety of end applications. Therefore, the load presented to a given standard power module is application dependent and may comprise a wide variety of impedance characteristics. The characteristics of the load itself and any intermediate elements that couple the load to the power supply directly affect the response of a control loop of the power supply, including system response time and stability. It may, therefore, be difficult to design a single standard power module capable of adequate performance over a wide range of possible applications.

Conventional power supplies are typically controlled using analog control techniques and circuitry. Such analog approaches, whether employing integrated circuits or discrete circuit elements, require a product designer to select a priori certain control loop parameters. Since the various characteristics of a particular load (e.g., capacitance, resistance) may not be known to the designer, the designer generally estimates such characteristics and selects the control loop parameters accordingly. The power supply may be further desensitized to anticipated variations in the characteristics, such as those caused by component tolerances and operating conditions.

Since the exact characteristics of the load are generally unknown, compromises are made in the design of the control loop with the consideration of these variations. System stability and a reasonable response to load transients may thus be achieved. However, the control loop is generally not optimized to the particular load. In addition, the impedance characteristics of the load can change over time, or as a result of the system itself being reconfigured. For example, aluminum electrolytic capacitors are subject to a well documented dryout mechanism in which the capacitance reduces as a function of temperature and time. Such a change in load characteristics would directly affect system performance. As another example, a given standard power module may power one or more boards in a system. As boards are added or removed, the impedance characteristics of the load will change, again affecting system performance.

In addition, the power converter may be subjected to a variety of load current conditions during use. It is well known in many power converter topologies that a control law governing the behavior of the power converter can change as a function of the load current. For example, in buck derived power converters, the control law can change as the power converter transitions through a critical current point (e.g., a change from continuous current mode to discontinuous current mode). Such changes in the control law of the power converter can affect a performance of the system employing the power converter, since a single loop compensation design may not be optimized for both modes of operation.

One way of optimizing the control loop is to exhaustively characterize a particular load. The control loop may then be adjusted accordingly by changing various circuit elements in the controller that determine the control loop parameters. This method, however, is generally time and cost intensive. Also, in this method, the load would usually be characterized at only one time, usually as the power module enters service. Variations in the load impedance subsequent to the initial characterization would not be accounted for, again affecting system performance.

Accordingly, what is needed in the art is a system and method for improving response of a control loop of the power supply that overcomes the deficiencies of the prior art.

SUMMARY OF THE INVENTION

To address the above-discussed deficiencies of the prior art, the present invention provides a system and method for improving response of a control loop of a power supply. The power supply is configured to drive a load having at least one characteristic associated therewith. In one embodiment, the system includes: (1) a sensing circuit, associated with the power supply, configured to sense the characteristic; and (2) a compensation circuit, coupled to the sensing circuit, configured to adaptively adjust the control loop based on the characteristic to improve the response.

The present invention introduces, in one aspect, a system for improving the response of a control loop of a power supply based on certain characteristics of a load coupled to the power supply. A load may present a range of variable characteristics that directly affect the response of the power supply control loop, such as system response time and stability. The present invention advantageously senses at least one of the characteristics, allowing the control loop to be adaptively adjusted to improve the response of the power supply.

In one embodiment of the present invention, the system forms a portion of a controller of the power supply. The controller is capable of operating the power supply to provide a current to the load. The sensing circuit then monitors a voltage of the load and determines the characteristic as a function of the voltage. In a related embodiment, the sensing circuit determines the characteristic as a function of a change in the voltage. In another related embodiment, the power supply provides the current to the load during a startup period. The amount of load capacitance, inductance, or other characteristics may be inferred, allowing appropriate adjustments to be made to the control loop.

In a related embodiment, the current is selected from the group consisting of: (1) a constant current; (2) a pulsed current; (3) a ramp current; and (4) a current having a periodic waveform. The current allows the characteristic to be readily sensed. Of course, in place of a current, a voltage may alternatively be supplied. The sensing circuit then determines the characteristic as a function of a change in sensed current.

In one embodiment of the present invention, the system forms a portion of a controller that provides a drive signal having a high frequency signal embedded therein to a power switch of the power supply. The sensing circuit then monitors an output voltage of the power supply and determines the characteristic as a function thereof. The response of the power supply and the load to the perturbation may be sensed by employing, for example, a coherent detection process.

In a related embodiment, the high frequency signal is periodic. In another related embodiment, the high frequency signal is selected from the group consisting of: (1) a sinusoidal signal; and (2) a square wave signal. Of course, other types of signals may be employed as may be appropriate in a particular case.

In one embodiment of the present invention, the characteristic is selected from the group consisting of: (1) a capacitance of the load; (2) a resistance of the load; and (3) an inductance of the load. Of course, other characteristics of the load may be sensed and employed to improve the response of the control loop.

In one embodiment of the present invention, the system forms a portion of a controller that employs a digital integrated circuit, such as a digital signal processor (DSP) or a programmable microprocessor. Of course, general purpose processors may also be employed and remain well within the scope of the present invention.

In one embodiment, the compensation circuit includes a look up table containing loop coefficients. In an alternative embodiment, the compensation circuit employs an algorithm that calculates loop coefficients. In either case, the compensation circuit employs the loop coefficients to adjust the control loop.

In one embodiment, the compensation circuit adaptively adjusts the control loop during a startup period. The control loop may thus be optimized for a particular load.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
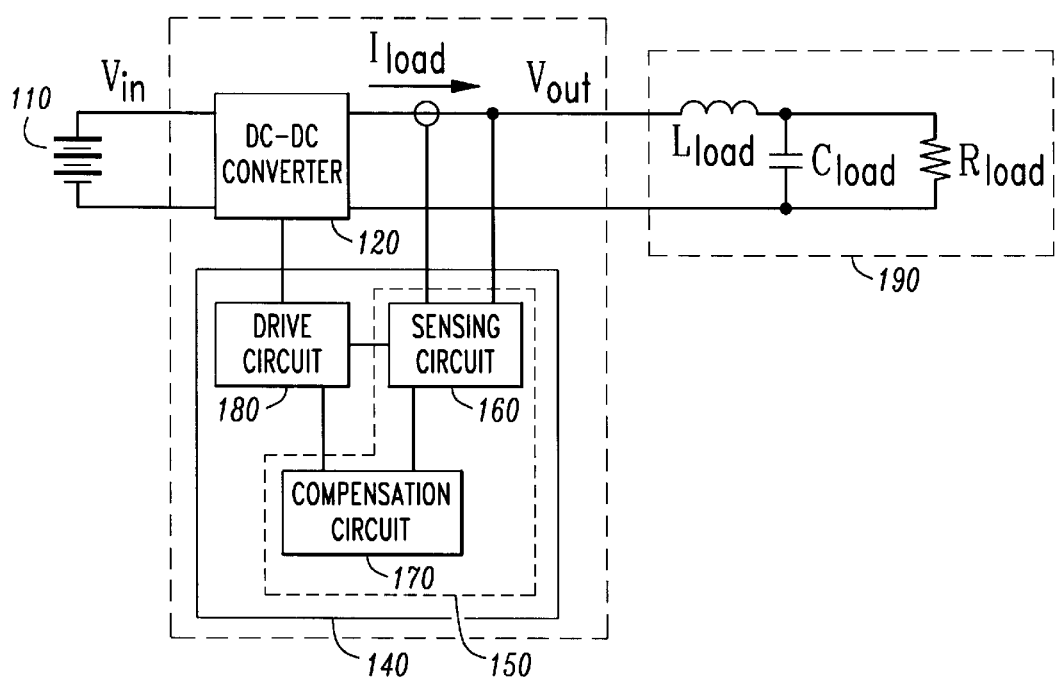
FIG. 1 illustrates a schematic diagram of an embodiment of a power supply constructed according to the principles of the present invention.

Referring initially to FIG. 1, illustrated is a schematic diagram of an embodiment of a power supply 100 constructed according to the principles of the present invention. The power supply 100 has an input couplable to a source of electrical power 110 having an input voltage Vin and an output that provides an output voltage Vout to a load 190. The power supply 100 includes a DC-DC converter 120 and a controller 140.

The DC-DC converter 120 may employ any conventional topology lap known to those skilled in the pertinent art, including buck, boost and buck-boost topologies employing discrete or integrated magnetics. The DC-DC converter 120 may employ isolated or non-isolated topologies as may be desired in a particular application.

The controller 140 may advantageously employ a digital integrated circuit, such as a digital signal processor (DSP). Alternatively, the controller 140 may employ a general purpose microprocessor or a specifically designed integrated circuit, such as an application specific integrated circuit (ASIC). In the illustrated embodiment, the controller 140 includes a system 150 for improving response of a control loop of the power supply 100. In the illustrated embodiment, the system 150 includes a sensing circuit 160 configured to sense a characteristic of the load 190. The system 150 further includes a compensation circuit 170 coupled to the sensing circuit 160. The compensation circuit 170 is configured to adaptively adjust the control loop based on the characteristic or characteristics sensed by the sensing circuit 160 to improve the response of the control loop of the power supply 100.

The controller 140 further includes a drive circuit 180 that provides drive signal(s) to drive the power switch(es) of the DC-DC converter 120. The drive circuit 180 may, for example, be a pulse-width modulation (PWM) drive circuit. Of course, other types of drive circuits are well within the scope of the present invention.

It should be understood that certain load characteristics (e.g., load capacitance) have considerable effect on the control loop of the power supply 100. The present invention, therefore, provides a methodology for determining at least one of the various load characteristics. In the illustrated embodiment, the load 190 is depicted as having a load capacitance Cload, a load resistance Rload and a load inductance Lload. For the sake of simplicity, the particular characteristics of the power supply 100 and any distribution network, which may couple the power supply 100 to the load 190, are considered as forming a portion of the load characteristics. For example, the output capacitance of the power supply 100 and any distribution network (not shown) is presumed to be included in and represented by the load capacitance Cload. Likewise, other characteristics observable by the power supply 100, including any output characteristic of the power supply 100 itself, the distribution network and the load 190 are presumed to be included in and represented by the particular load characteristic.

The system 150 operates as follows. The controller 140 operates the DC-DC converter 120 to provide a current to the load 190. The sensing circuit 160 monitors the output voltage Vout across the load 190 and determines the pertinent characteristic as a function of the output voltage Vout or a change in the output voltage Vout.

In the illustrated embodiment, the current is a small constant test current Itest delivered by the power supply 100 to the load 190. A changing output voltage Vout across the load 190 may increase in accordance with the following equation:

$$Vout(t)=Itest*Rload*(1-exp(-t/Rload*Cload)) \quad (1)$$

wherein Vout(t) represents the output voltage Vout over a time t.

Over a sufficiently short time interval, the rate of increase of the output voltage Vout may be approximated as set forth below.

$$dVout/dt=Itest/Cload \quad (2)$$

This allows the output capacitance Cload to be estimated in accordance with the equation set forth below.

$$Cload=Itest/(dVout/dt) \quad (3)$$

Further, if the test current is allowed to flow for a longer period of time, the output voltage Vout at steady state may be represented as set forth below.

$$Vout=Itest*Rload \quad (4)$$

The load resistance Rload may be estimated from the above equation (4).

Of course, the controller 140 may alternatively operate the DC-DC converter 120 to supply a voltage to the load 190 in place of the current. The sensing circuit 160 then monitors the output current through the load 190 and determines the pertinent characteristic as a function of the output current or a change in the output current.

While the illustrated embodiment employs a constant current, those skilled in the pertinent art will realize that the use of a pulsed current, a ramp current, or any current having a periodic waveform is well within the scope of the present invention. For a general test current Itest, the response of the load 190 can be measured and its characteristics estimated or inferred from the following equation using the Laplace transform.

$$Zload(s)=Vout(s)/Itest(s) \quad (5)$$

In any case, once the pertinent characteristics have been sensed, the compensation circuit 170 may adaptively adjust the control loop based on the characteristics to improve the response of the control loop of the power supply 100. The characteristics may be advantageously sensed during a startup period of the power supply 100 to enable the control loop to be optimized for the particular load 190. Of course, the characteristics may be sensed at other times as well, to enable the power supply 100 to dynamically adjust to any changes in the characteristics that may occur in the load 190 during its operation.

Figure 2:
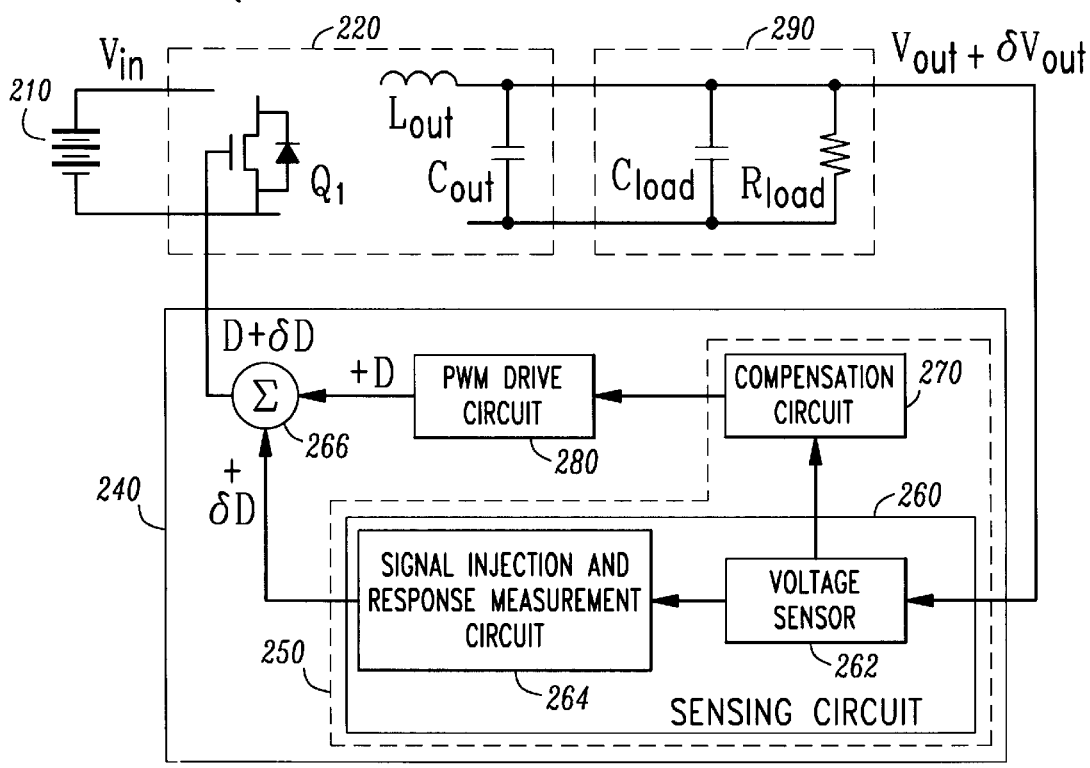
FIG. 2 illustrates a schematic diagram of another embodiment of a power supply constructed according to the principles of the present invention.

Turning now to FIG. 2, illustrated is a schematic diagram of another embodiment of a power supply 200 constructed according to the principles of the present invention. The power supply 200 has an input couplable to a source of electrical power 210 having an input voltage Vin and an output configured to provide a nominal output voltage Vout to a load 290. The power supply 200 includes a DC-DC converter 220 and a controller 240.

The DC-DC converter 220 includes at least one power switch Q1 and may employ an output filter (e.g., output inductor Lout and output capacitor Cout). The DC-DC converter 220 may employ any conventional isolated or non-isolated topology known to those skilled in the pertinent art, including those from the buck, boost and buck-boost families.

The controller 240 may advantageously employ a digital integrated circuit, such as a digital signal processor (DSP). Of course, the controller 240 may also include analog components as may be required. The controller 240 includes a system 250 for improving response of a control loop of the power supply 200. The controller 240 further includes a pulse-width modulation (PWM) drive circuit 280 that provides a PWM drive signal to drive the power switch Q1 of the DC-DC converter 220. Of course, those skilled in the pertinent art will realize that the PWM drive circuit 280 may provide more than one drive signal, depending on the number of power switches employed in the DC-DC converter 220. While the illustrated drive circuit 280 is a PWM drive circuit, other types of drive circuits are well within the scope of the present invention.

The system 250 includes a sensing circuit 260 configured to sense a characteristic of the load 290. In the illustrated embodiment, the sensing circuit 260 includes a voltage sensor 262, along with its related components. The sensing circuit 260 may also include a current sensor in addition to or alternatively with the voltage sensor 262. Of course, other types of sensors may be employed and remain well within the scope of the present invention. The sensing circuit 260 further includes a signal injection and response measurement circuit 264.

The system 250 further includes a compensation circuit 270 coupled to the sensing circuit 260. The compensation circuit 270 is configured to adaptively adjust the control loop based on the characteristic or characteristics sensed by the sensor 260 to improve the response of the control loop.

The power supply 200 operates as follows. The PWM drive circuit 280 provides the drive signal having a nominal duty cycle D to the power switch Q1. The PWM drive circuit 280 adjusts the drive signal based on the nominal output voltage Vout to maintain the nominal output voltage Vout at a substantially constant level. Those skilled in the pertinent art are familiar with conventional PWM drive circuits and their operation.

To sense the characteristics of the load 290 and the power supply 200, the signal injection and response measurement circuit 264 provides a small perturbing signal having a perturbation duty cycle δD that is superimposed onto the drive signal (having the nominal duty cycle D) from the PWM drive circuit 280. In the illustrated embodiment, the perturbing signal is combined with the drive signal in a summer 266. Of course, other methods of combining the perturbing signal with the drive signal are well within the scope of the present invention.

The sensing circuit 260 employs the voltage sensor 262 to sense the response of the power supply 200 and the load 290 to the perturbation. In the illustrated embodiment, the voltage sensed at the output of the power supply 200 may be represented as follows:

$$Vout + -\delta Vout \qquad (6)$$

wherein the nominal output voltage Vout represents a portion of the output voltage resulting from the nominal duty cycle D, while the perturbation output voltage δVout represents a portion of the output voltage resulting from the perturbation duty cycle δD. The perturbation signal may be a high frequency, periodic signal, such as a sinusoidal signal or a square wave signal. In the illustrated embodiment, the perturbation signal is a periodic sinusoidal signal having a frequency in the vicinity of an expected frequency where the control loop crosses the unity-gain axis. An amplitude of the perturbation signal may be selected to be sufficiently small, such that an output ripple of the power supply 200 remains well within acceptable tolerances.

Due to the substantially linear nature of the power supply-load system, the response of the power supply 200 is at substantially the same frequency or frequencies as the perturbation signal. The perturbation output voltage δVout may be detected using a coherent detection process, such as by multiplying the total output voltage (Vout+δVout) by a sinusoidal waveform of substantially the same frequency and phase as the perturbation signal. The result may then be integrated and scaled over a sufficiently long time interval T to provide an estimate of the amplitude of the in-phase perturbed response δVout,ip in accordance with the equation set forth below.

$$\delta Vout, ip = 2/T \cdot \int (Vout + \delta Vout) \cdot \sin(\omega t) dt \qquad (7)$$

Similarly, the quadrature response δVout,q of the power supply 200 and the load 290 to the perturbation signal may be determined by multiplying the total output voltage (Vout+δVout) by a sinusoidal waveform of substantially the same frequency as the perturbation signal, but 90 degrees out of phase. The result may then be integrated and scaled over a sufficiently long time interval T to provide an estimate of the amplitude of the quadrature response δVout,q in accordance with the equation set forth below.

$$\delta Vout, q = 2/T \cdot \int (Vout + \delta Vout) \cdot \cos(\omega t) dt \qquad (8)$$

A total duty cycle (D+δD) of the drive signal can be measured at a switching frequency ω of the power switch Q1 since the injected perturbation duty cycle δD is transmitted through the power supply 200 and the control loop and appears superimposed on the nominal duty cycle D. The in-phase component D+δD,ip and the quadrature component D+δD,q of the drive signal may be extracted using a coherent detection process in accordance with the following equations set forth below.

$$\delta D, ip = 2/T \cdot \int (D + \delta D) \cdot \sin(\omega t) dt \qquad (9)$$

$$\delta D, q = 2/T \cdot \int (D + \delta D) \cdot \cos(\omega t) dt \qquad (10)$$

The in-phase component δD,ip and the quadrature component δD,q of the drive signal and the response of the power supply-load system thereto form the basis from adjusting various parameters of the control loop. A gain G(s) of the power supply-load system may be represented by the ratio set forth below.

$$G(s) = \delta Vout(s)/\delta D(s) \quad (11)$$

A control loop portion of the gain G(s) may be altered, for example, such that there is about 45 to 55 degrees of phase margin at the frequency where the control loop crosses the unity-gain axis.

In the illustrated embodiment, integration of the above equations may be conveniently performed using standard numerical techniques. The integration may be performed over a number of switching cycles (e.g., n*m switching cycles, wherein n is an integer, such as 10; and m is an integer about a ratio of the switching frequency to the frequency where the control loop crosses the unity-gain axis). The values of the sines and cosines may, for example, be stored in look-up tables. An integration step may then be performed each switching cycle (for each integral) until the integration is completed. To improve the accuracy of the numerical integration process, a constant near the nominal output voltage Vout may be subtracted from the total output voltage (Vout+δVout).

The compensation circuit 270 may adjust the control loop during a startup period (shortly after the startup of the power supply 200). Alternatively, the compensation circuit 270 may adjust the control loop repeatedly over time. The parameters of the control loop should preferably be initially set to conservative values capable of accommodating stable operation over a wide range of load characteristics. Once the particular load characteristics and, in the illustrated embodiment, the characteristics of the power supply 200 and any distribution network associated with therewith are determined, the compensation circuit 270 may adjust the control loop to improve the control of the power supply 200.

The compensation circuit 270 may further adjust the control loop in response to changes in an impedance of the load, which may occur over time. Alternatively, the compensation circuit 270 may adjust the control loop to optimize a performance of the power supply 200 due to changes in load current. The compensation circuit 270 may thus compensate for changes in a control law governing the behavior of the power converter, which may change as a function of the load current. Adjustment of the control loop may be accomplished using the aforementioned techniques, along with an understanding of the various characteristics of the control law.

For example, the change in the control law could be detected through a direct detection of load current in combination with calculations derived from a knowledge of the component values (e.g., inductance, capacitance) employed in the power supply 200. Alternatively, the coherent detection process previously discussed may be employed to detect a change in a phase and gain of the control loop at a given frequency or frequencies. This information may then be used to recompensate the control loop. In some power supply topologies employing discontinuous inductor current, the control law associated therewith may be a direct function of the inductor current or a load current. The compensation circuit 270 of the present invention may be employed to continuously vary the control loop of the power supply 200, thus providing for a continuous optimization of system performance.

Figure 3:
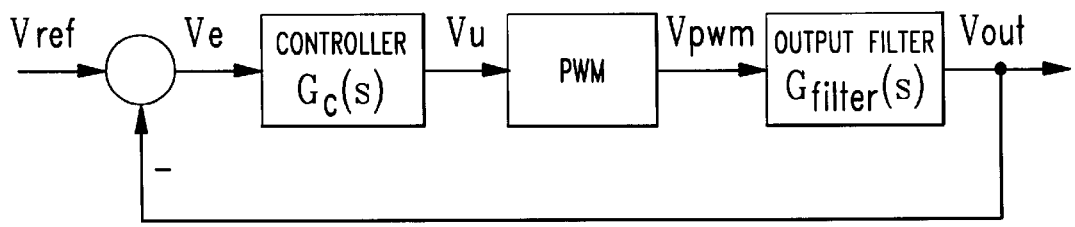
FIG. 3 illustrates a block diagram of an analog control loop for a buck converter.

Turning now to FIG. 3, illustrated is a block diagram of an analog control loop 100 for an exemplary buck converter. The control loop 100 is obtained from *Digital Control for Switching Converters*, by T. W. Martin and S. S. Ang, Proceedings of the IEEE International Symposium on Industrial Electronics 1995, pages 480–484, which is incorporated herein by reference in its entirety.

The transfer function of an output filter of the buck converter may be given by the following equation.

$$G_{filter}(s) = \frac{V_{out}(s)}{V_{pwm}(s)} = \frac{10^8}{s^2 + 10^3 s + 10^8} \quad (12)$$

Pulse-width modulation is a technique of modulating the duty cycle, d, or duration of the on and off pulses that are applied to the switching transistor in a switching converter in accordance with the following equation.

$$d = \frac{t_{on}}{t_{on} + t_{off}} \quad (13)$$

This may be achieved by comparing an error voltage to a sawtooth signal. In the illustrated embodiment, the pulse-width modulator may be of the fixed frequency type, with a sawtooth signal frequency of about 25 kHz.

An analog control loop, such as that illustrated in FIG. 3, may be designed in accordance with the following specifications: percent overshoot=5%; rise time=0.01 seconds; and steady state error due to step input=0. These performance specifications can be met with a closed-loop pole located at s−150±j 150. The following equation of an analog control loop satisfies the above performance specifications using root-locus techniques.

$$G_c(s) = \frac{V_u(s)}{V_e(s)} = \frac{1.2857 \times 10^{-4}[s^2 + 10^3 s + 10^8]}{s^2 + 300s} \quad (14)$$

Figure 4:
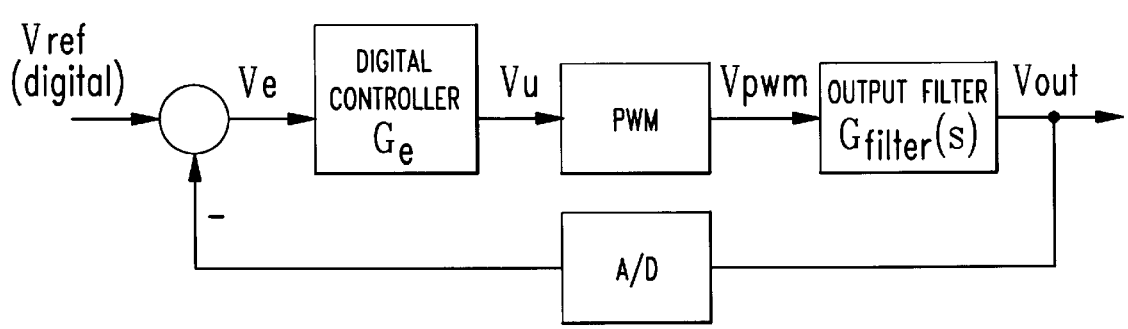
FIG. 4 illustrates a block diagram of a digital control loop for a buck converter.

Turning now to FIG. 4, illustrated is a block diagram of a digital control loop 400 for a buck converter. The digital control loop 400 may be developed by using the analog control loop illustrated and described with respect to FIG. 3 and the following bilinear transformation, which is obtained from *Modern Digital Control Systems*, by R. G. Jacquot, Marcel Dekker, Inc. (1995). The digital control loop 400 is obtained from Digital Control for Switching Converters, by T. W. Martin and S. S. Ang, referenced above.

$$s = \frac{2}{T}\left(\frac{z-1}{z+1}\right) \quad (15)$$

The transfer function of the buck converter may be given by the following equation, assuming a sampling time of 0.000125 seconds.

$$G_e(s) = \frac{V_u(s)}{V_e(s)} = \frac{1.834 \times 10^{-4}[z^2 - 0.8386z + 0.9138]}{z^2 - 1.9632z + 0.9632} \quad (16)$$

The analog control loop illustrated with respect to FIG. 3 may be redesigned using a matched pole-zero method of transformation given by the following equation, which is obtained from *Modern Digital Control Systems*, by R. G. Jacquot, Marcel Dekker, Inc. (1995).

$$Z = e^{sT} \quad (17)$$

The resulting cascade discrete controller may be given by the following equation.

$$G_e(z) = \frac{V_u(z)}{V_e(z)} = \frac{1.532 \times 10^{-4}[z^2 - 0.5953z + 0.8825]}{z^2 - 1.9632z + 0.9632} \quad (18)$$

The analog plant, zero-order hold circuit, and samplers may be transformed into an approximate discrete plant, which may be given by the following equation.

$$G_{filter}(s) = \frac{V_{out}(z)}{V_{pwm}(z)} = \frac{0.6577(z + 0.9570)}{z^2 - 0.5952z + 0.8825} \quad (19)$$

The closed-loop pole locations (s=−150±j 150) determined from the analog control loop illustrated and described with respect to FIG. 3, may be transformed into the z-plane using the bilinear transformation previously described in equation (15). The resulting closed-loop pole locations in the z-plane are at z=0.9813±j 0.01840.

Using root-locus techniques to place the closed-loop poles of the discrete system at the desired locations results in a cascade discrete control loop represented by the following equation.

$$G_c(s) = \frac{V_u(z)}{V_e(z)} = \frac{1.2857 \times 10^{-4}[s^2 + 10^3 s + 10^8]}{s^2 + 300s} \quad (20)$$

Figure 5:
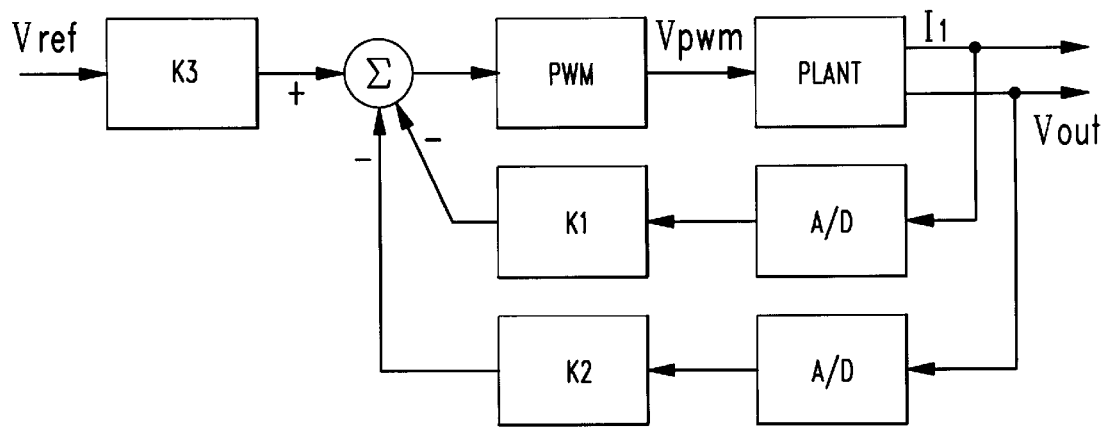
FIG. 5 illustrates a block diagram of a state feedback controller constructed in accordance with the principles of the present invention.

Turning now to FIG. 5, illustrated is a block diagram of a state feedback controller 500. The state feedback controller 500 is obtained from *Digital Control for Switching Converters*, by T. W. Martin and S. S. Ang, referenced above. As with the previously described direct design techniques, a discrete approximation of the plant, zero-order holds, and sampler is first obtained. In the illustrated embodiment, a state-space representation of the analog plant is obtained where the appropriate state can be measured or estimated.

The state-space representation of the illustrated embodiment is as follows.

$$\begin{bmatrix} \dot{x}_1 \\ \dot{x}_2 \end{bmatrix} = \begin{bmatrix} 0 & -10^4 \\ 10^4 & -10^3 \end{bmatrix} \begin{bmatrix} x_1 \\ x_2 \end{bmatrix} + \begin{bmatrix} 10^4 \\ 0 \end{bmatrix} V_{pwm} \quad (21)$$

$$V_a = [0 \quad 1] \begin{bmatrix} x_1 \\ x_2 \end{bmatrix}$$

In the above equation (21), $x_1$ is the current Il through the inductor of the output filter, while $x_2$ is the output voltage Vout of the output filter. The elements of the load are assumed to be included in the output filter.

The discrete approximation of the analog plant, zero-order holds, and samplers in state-space form is given by the following equations.

$$\begin{bmatrix} \dot{x}_1 \\ \dot{x}_2 \end{bmatrix} = \begin{bmatrix} 0.3422 & -0.8921 \\ 0.8921 & 0.2530 \end{bmatrix} \begin{bmatrix} x_1 \\ x_2 \end{bmatrix} + \begin{bmatrix} 0.9571 \\ 0.6571 \end{bmatrix} V_{pwm} \quad (22)$$

$$V_a = [0 \quad 1] \begin{bmatrix} x_1 \\ x_2 \end{bmatrix}$$

Gains of k1=−0.02 and k2=−0.2836 will place the closed-loop poles at z=0.9813±j 0.01840. K3 may then be chosen for a specific input to adjust the steady-state error to zero. In the illustrated embodiment, K3=0.01 since the reference voltage Vr is 5 volts.

The above example demonstrates the design of a digital controller where the response of the system to a known input can be described. The design parameters for the controller can be readily represented in a table, curve fit, or other representation for a different or changed system response. Thus, as a characteristic of the load is altered and sensed, new control parameters may be readily determined. Those skilled in the art should understand that the previously described embodiments of the power supply and system for improving response of a control loop of the power supply are submitted for illustrative purposes only and other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. For a better understanding of a variety of power converter topologies employing discrete and integrated magnetic techniques, see, Modern DC-to-DC Switchmode Power Converter Circuits, by Rudolph P. Severns and Gordon Bloom, Van Nostrand Reinhold Company, New York, N.Y. (1985), which is incorporated herein by reference in its entirety. In addition, for a better understanding of discrete-time representation and control of analog systems, see *Digital Signal Processing, 3rd Edition*, by J. G. Proakis and D. G. Manolakis, Prentice Hall (1996), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. For use with a power supply configured to drive a load having at least one characteristic associated therewith, a system for improving response of a control loop of said power supply, comprising:
    a sensing circuit, associated with said power supply, configured to sense said characteristic; and
    a compensation circuit, coupled to said sensing circuit, configured to adaptively adjust at least one parameter of said control loop based on said characteristic to improve said response.

2. The system as recited in claim 1 wherein said system forms a portion of a controller of said power supply, said controller operating said power supply to provide a current to said load, said sensing circuit monitoring a voltage of said load and determining said characteristic as a function thereof.

3. The system as recited in claim 2 wherein said sensing circuit determines said characteristic as a function of a change in said voltage.

4. The system as recited in claim 2 wherein said power supply provides said current to said load during a startup period.

5. The system as recited in claim 2 wherein said current is selected from the group consisting of:
    a constant current;
    a pulsed current;
    a ramp current; and
    a current having a periodic waveform.

6. The system as recited in claim 1 wherein said system forms a portion of a controller that provides a drive signal having a high frequency signal embedded therein to a power switch of said power supply, said sensing circuit monitoring an output voltage of said power supply and determining said characteristic as a function thereof.

7. The system as recited in claim 6 wherein said high frequency signal is periodic.

8. The system as recited in claim 6 wherein said high frequency signal is selected from the group consisting of:
   a sinusoidal signal; and
   a square wave signal.

9. The system as recited in claim 1 wherein said system forms a portion of a controller of said power supply, said controller operating said power supply to provide a voltage to said load, said sensing circuit monitoring a current of said load and determining said characteristic as a function thereof.

10. The system as recited in claim 1 wherein said characteristic is selected from the group consisting of:
    a capacitance of said load;
    a resistance of said load; and
    an inductance of said load.

11. The system as recited in claim 1 wherein said system forms a portion of a controller that employs a digital integrated circuit.

12. The system as recited in claim 1 wherein said compensation circuit comprises a look up table containing loop coefficients, said compensation circuit employing said loop coefficients to adjust said control loop.

13. The system as recited in claim 1 wherein said compensation circuit employs an algorithm that calculates loop coefficients, said compensation circuit employing said loop coefficients to adjust said control loop.

14. The system as recited in claim 1 wherein said compensation circuit adaptively adjusts said control loop during a startup period.

15. The system as recited in claim 1 wherein said system employs a coherent detection process to sense said characteristic.

16. For use with a power supply that drives a load having at least one characteristic associated therewith, a method for improving response of a control loop of said power supply, comprising:
    sensing said characteristic with a sensor associated with said power supply; and
    adaptively adjusting at least one parameter of said control loop based on said characteristic to improve said response.

17. The method as recited in claim 16 wherein said sensing comprises:
    providing a current to said load;
    monitoring a voltage of said load; and
    determining said characteristic as a function of said voltage.

18. The method as recited in claim 17 wherein said determining comprises determining said characteristic as a function of a change in said voltage.

19. The method as recited in claim 17 wherein said sensing is performed during a startup period.

20. The method as recited in claim 17 wherein said current is selected from the group consisting of:
    a constant current;
    a pulsed current;
    a ramp current; and
    a current having a periodic waveform.

21. The method as recited in claim 16 wherein said sensing comprises:
    providing a drive signal having a high frequency signal embedded therein to a power switch of said power supply;
    monitoring an output voltage of said power supply; and
    determining said characteristic as a function of said output voltage.

22. The method as recited in claim 21 wherein said high frequency signal is a periodic signal.

23. The method as recited in claim 21 wherein said high frequency signal is selected from the group consisting of:
    a sinusoidal signal; and
    a square wave signal.

24. The method as recited in claim 16 wherein said sensing comprises:
    providing a voltage to said load;
    monitoring a current of said load; and
    determining said characteristic as a function of said current.

25. The method as recited in claim 16 wherein said characteristic is selected from the group consisting of:
    a capacitance of said load;
    a resistance of said load; and
    an inductance of said load.

26. The method as recited in claim 16 wherein said adaptively adjusting said control loop is performed by a digital integrated circuit.

27. The method as recited in claim 16 wherein said adaptively adjusting comprises:
    looking up loop coefficients in a look up table; and
    employing said loop coefficients to adjust said control loop.

28. The method as recited in claim 16 wherein said adaptively adjusting comprises:
    calculating loop coefficients; and
    employing said loop coefficients to adjust said control loop.

29. The method as recited in claim 16 wherein said adaptively adjusting is performed during a startup period.

30. The method as recited in claim 16 wherein said sensing comprises employing a coherent detection process to sense said characteristic.

* * * * *